(12) United States Patent
Burdgick

(10) Patent No.: US 6,971,844 B2
(45) Date of Patent: Dec. 6, 2005

(54) HORIZONTAL JOINT SEALING SYSTEM FOR STEAM TURBINE DIAPHRAGM ASSEMBLIES

(75) Inventor: Steven Sebastian Burdgick, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 10/446,685

(22) Filed: May 29, 2003

(65) Prior Publication Data

US 2004/0240986 A1   Dec. 2, 2004

(51) Int. Cl.[7] ............................................. F01D 25/26
(52) U.S. Cl. .................... 415/139; 415/170.1
(58) Field of Search ............... 415/139, 170.1, 415/173.5, 174.5

(56) References Cited

U.S. PATENT DOCUMENTS

| | | | |
|---|---|---|---|
| 6,340,285 B1 * | 1/2002 | Gonyou et al. | 415/116 |
| 6,343,911 B1 * | 2/2002 | Burdgick | 415/115 |
| 6,419,445 B1 * | 7/2002 | Burdgick | 415/116 |
| 6,648,332 B1 * | 11/2003 | Burdgick | 277/303 |
| 6,722,846 B2 * | 4/2004 | Burdgick | 415/173.5 |
| 6,722,850 B2 * | 4/2004 | Burdgick | 415/230 |

* cited by examiner

Primary Examiner—Hoang Nguyen
(74) Attorney, Agent, or Firm—Nixon & Vanderhye P.C.

(57) ABSTRACT

Spline seals are provided in registering end faces of upper and lower diaphragm segments in a steam turbine at each of the horizontal joints. The diaphragm segments each include inner and outer semi-annular rings with circumferentially spaced partitions extending therebetween. The registering end faces of each of the inner and outer semi-annular rings of the segments are spanned by spline seals which may comprise a sheet metal plate, a sheet metal body having reversely-curved ends, a solid body having bulbous ends or a sheet metal plate covered by a metallic or ceramic woven cloth. Leakage paths, both in axial and radial directions, are minimized or precluded.

15 Claims, 4 Drawing Sheets

HORIZONTAL JOINT SEALING SYSTEM FOR STEAM TURBINE DIAPHRAGM ASSEMBLIES

BACKGROUND OF THE INVENTION

The present invention relates generally to seals between circumferentially registering end faces of diaphragm segments in steam turbine diaphragm assemblies, and particularly relates to spline seals between the registering end faces of the inner and outer semi-annular rings forming upper and lower diaphragm segments at the horizontal joint between the segments.

In steam turbine design, it is highly desirable to minimize or eliminate as many steam leakage paths as possible from the steam flowpath. Each stage of a steam turbine includes a plurality of circumferentially spaced buckets mounted on a rotor and a diaphragm assembly carrying a plurality of partitions, the buckets and partitions forming a turbine stage of the steam turbine. Each diaphragm assembly typically comprises an upper semi-annular diaphragm segment and a lower semi-annular diaphragm segment. The upper and lower diaphragm segments reside in an outer casing. Each of the upper and lower segments includes an inner and outer semi-annular or half-ring between which extend a plurality of circumferentially spaced partitions forming nozzles. The nozzles direct the steam through the assembled diaphragm.

When the steam turbine is assembled, the end faces of the upper and lower diaphragm segments register one with the other at the horizontal joints or midline of the steam turbine. The segments may or may not be bolted to one another. The horizontal joints of the segments oftentimes form leakage paths during operating conditions. These leakage paths may occur due to a gap upon assembly of the steam turbine or may be caused by thermal growth that causes a gap to open at operating conditions. The steam leakage can be significant and causes lower machine efficiency, i.e., reduced performance, and hence potential loss of revenue for the power plant operator. A typical end face gap might be from 0.0 to about 0.07 inches and, in some cases, greater. For unbolted joints, the gap may be more significant as the upper and lower segments are located and retained in the upper and lower halves of the turbine shell, respectively, of the turbine shell. If the upper and lower diaphragm segments are not accurately located in the turbine shells, a significant gap may occur at the horizontal joints of the diaphragm segments. It will be appreciated that diaphragm segments oftentimes employ a substantial key to keep the segments aligned. However, the key is not primarily for sealing at the joint interface although the key does discourage a limited amount of steam leakage flow.

BRIEF DESCRIPTION OF THE INVENTION

In accordance with a preferred embodiment of the present invention, there are provided spline seals for sealing the horizontal joint of the diaphragm segments in a steam turbine for minimizing or eliminating steam leakage flow across the horizontal joint of the diaphragm assembly. The spline seals are provided in opposed registering slots of each of the inner and outer semi-annular rings of the diaphragm segments at the horizontal joints. The spline seals may be provided as part of original equipment manufacture or as retrofits.

The specific spline seals are provided in slots formed by EDM or conventional milling processes. The slots may be provided in each of the end faces of the inner and outer semi-annular segments in an axial extending direction, as well as a generally radially outwardly extending direction. Thus, the spline seals minimize or eliminate leakage flows in a generally radial direction, as well as an axial direction across the horizontal joints. The spline seals may comprise thin sheet metal seals, Q-tip type seals having opposite ends of the sheet metal reversely curved or bent to form end enlargements or cloth seals. Cloth seals may comprise sheet metal strips covered with woven metal cloth and disposed in the registering slots.

In a preferred embodiment according to the present invention, there is provided a steam turbine comprising a rotor carrying a plurality of circumferentially spaced buckets, a diaphragm assembly surrounding the rotor including upper and lower diaphragm segments having end faces in registration with one another adjacent horizontal joints of the turbine, each segment including substantially semi-annular outer and inner rings carrying a plurality of circumferentially spaced partitions therebetween, the buckets and partitions forming a stage of the steam turbine, the registering end faces of one of the inner and outer semi-annular rings at each horizontal joint having slots opening therethrough and in general circumferential registration with one another and a spline seal in the slots extending between each of the opposed end faces of circumferentially adjacent segments for minimizing or precluding steam leakage flow past the registering end faces.

In a further preferred embodiment according to the present invention, there is provided a steam turbine comprising a rotor carrying a plurality of circumferentially spaced buckets, a diaphragm assembly surrounding the rotor including upper and lower diaphragm segments having end faces in registration with one another adjacent horizontal joints of the turbine, each segment including substantially semi-annular outer and inner rings carrying a plurality of circumferentially spaced partitions therebetween, the buckets and partitions forming a stage of the steam turbine, the registering end faces of the inner and outer semi-annular rings at each horizontal joint having slots opening therethrough and in general circumferential registration with one another and a first spline seal extending between each of the opposed end faces of circumferentially adjacent inner rings and in the slots thereof, and a second spline seal extending between each of the opposed end faces of circumferentially adjacent outer rings and in the slots, whereby steam leakage flow past the registering end faces is minimized or precluded.

DETAILED DESCRIPTION OF THE INVENTION

Figure 1:
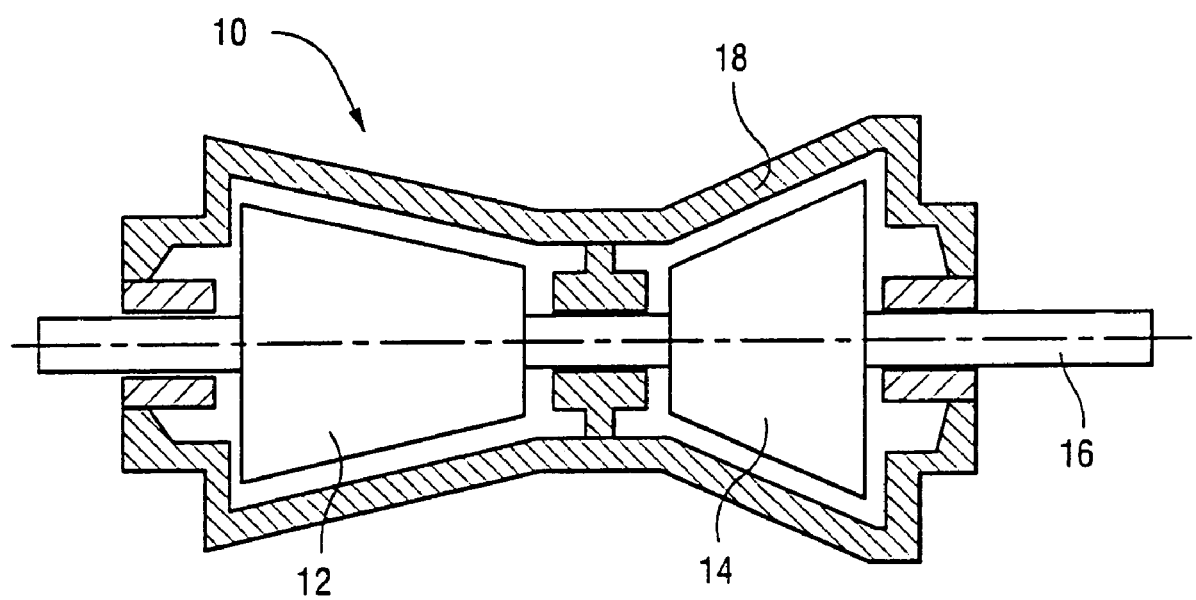
FIG. 1 is a schematic representation of a high and intermediate pressure turbine.
Figure 2:
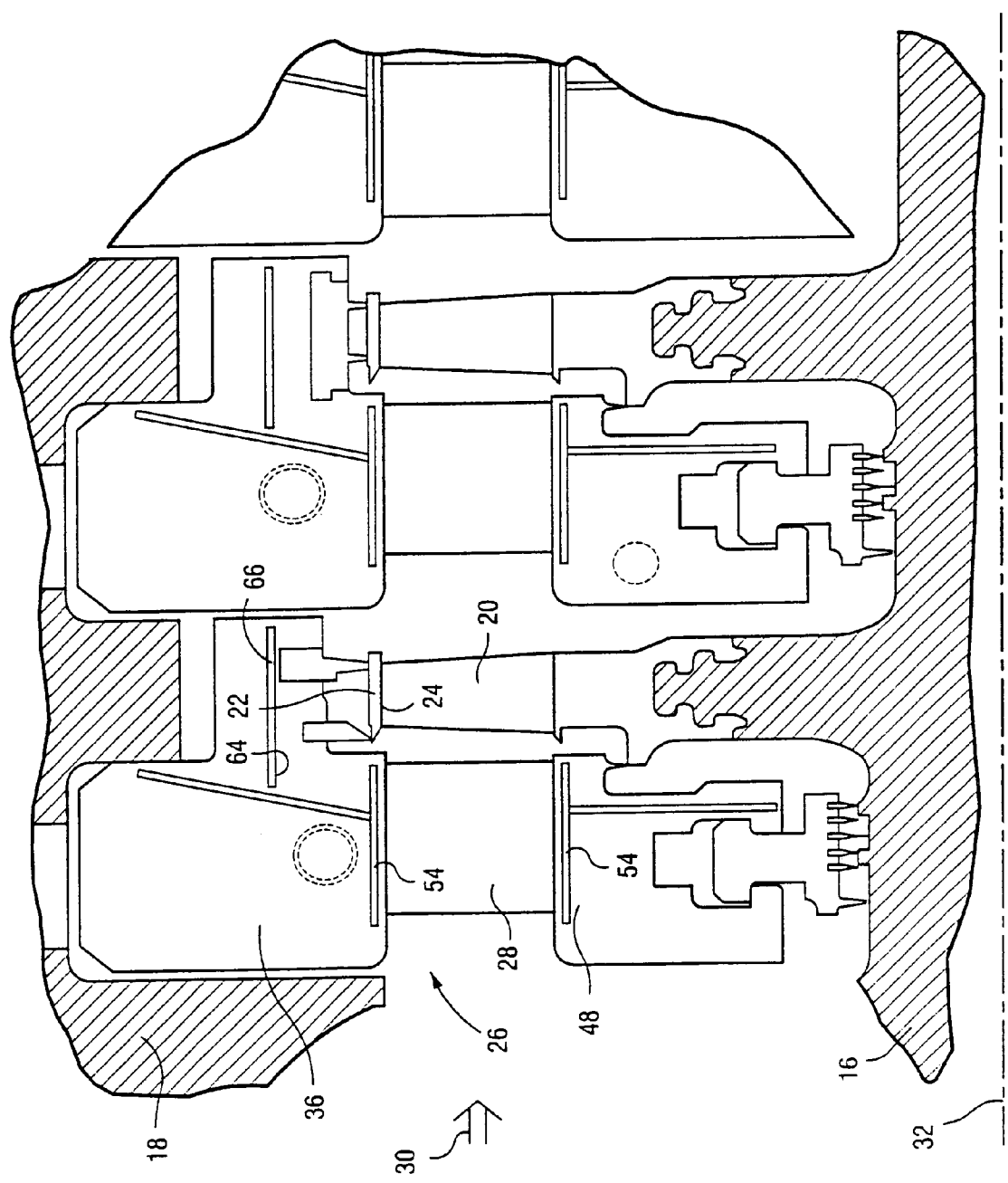
FIG. 2 is a fragmentary cross-sectional view taken generally about the turbine at the horizontal midline joint thereof illustrating end faces of the diaphragm segments, portions of the rotor and the outer shell.

Referring now to the drawings, particularly to FIG. 1, there is illustrated a steam turbine, generally designated 10. Steam turbine 10, in this schematic example, is comprised of a high pressure turbine section 12 and an intermediate pressure turbine section 14 mounted on a single integral rotor 16 extending beyond opposite ends of a steam turbine casing 18. It will appreciated that the rotor 16 is driven in rotation by the high and intermediate pressure sections 12 and 14, while the casing 18 remains stationary. As typical in steam turbines, and referring to FIG. 2, rotor 16 mounts a plurality of spaced buckets 20 typically having cover plates 22 at their tips 24. Each turbine section includes a diaphragm assembly, generally designated 26, mounting a plurality of partitions 28 defining nozzles. Axially adjacent buckets 20 and the nozzles form a stage of the steam turbine 10 and it will be appreciated that two stages are illustrated in FIG. 2, although any number of additional stages are typical. The steam flowpath through nozzles 28 and buckets 20 is indicated by the steam flow direction arrow 30. The axis of rotation of the rotor is indicated at 32.

It will be appreciated that the diaphragm assembly 26 is disposed about the rotor 16 and maintained within the outer casing 18, by means not shown. Each diaphragm assembly 26 includes an upper and a lower diaphragm segment 34 and 36, respectively (FIG. 3), each extending approximately 180° and mating along a horizontal midline joint 40. Upper diaphragm segment 34 includes semi-annular inner and outer rings 42 and 44, respectively (FIG. 3), having a plurality of circumferentially spaced partitions 28 extending between the semi-annular rings. Similarly, the lower diaphragm segment 36 includes semi-annular inner and outer rings 48 and 50, respectively (FIG. 3), having a plurality of circumferentially spaced partitions 28 between the semi-annular rings. The partitions 28 form stationary nozzles for deflecting the steam flow along the steam path 30.

Figure 3:
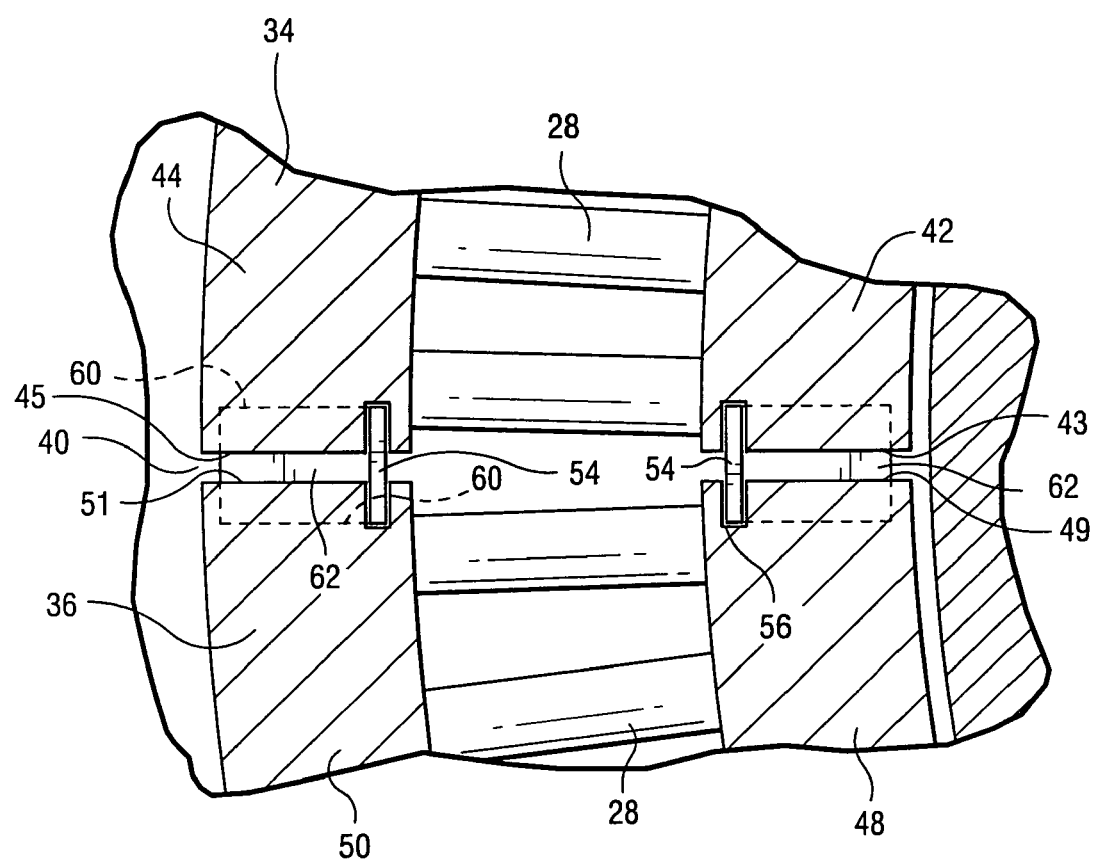
FIG. 3 is a fragmentary schematic illustration of a spline seal between the diaphragm segments with the joint between the segments being greatly exaggerated for explanatory purposes.

In accordance with a preferred embodiment of the present invention as illustrated in FIGS. 2 and 3, spline seals are interposed between registering end faces 43 and 49 of the inner semi-annular rings 42 and 48, respectively, at each of the horizontal joints. Similarly, spline seals are provided between the end faces 45 and 51 of the outer semi-annular rings 44 and 50, respectively, at each of the horizontal joints. The spline seals at each of the registering end faces for the inner and outer semi-annular rings are identical and a description of one suffices as a description for the others. Each spline seal 54 may comprise a thin sheet of metal, e.g., having a stock thickness of about 0.01 inches, extending in registering slots 56 (FIG. 3) formed in the end faces. The slots 56 may be formed using an EDM process or conventional milling operation and may be formed as original equipment manufacture or as a retrofit. Particularly, at each end face, a slot 56 is formed which extends generally parallel to the axis of rotation 32 (FIG. 2) of the turbine. The spline seal 54 extends in the slots substantially coextensively therewith and lies radially close to the steam path as illustrated in FIG. 2. Spline seals 54 therefore seal against radial flow of the steam from the hot gas path 30. For example, the spline seals 54 sealing between the end faces of the inner ring halves 42 and 48 at midline joints preclude radial inward flow of the steam. The spline seals 54 between the registering end faces of the outer ring halves 44 and 50 seals against radial outflow of the steam from the steam path.

Additionally, each of the end faces of the inner and outer ring halves has a further slot 60 (FIG. 3) which extends generally in a radial direction and which slot 60 registers with an opposed slot 60 in the opposite end face. A spline seal 62 is inserted into the registering slots and generally seals against axial flow of steam past the diaphragm segments. Additional locations of registering slots 64 and spline seals 66 located in the slots at the registering end faces of the outer ring halves 44 and 50 are located radially outwardly of the bucket tips to prevent radial outflow of steam from the flowpath.

Figure 4:
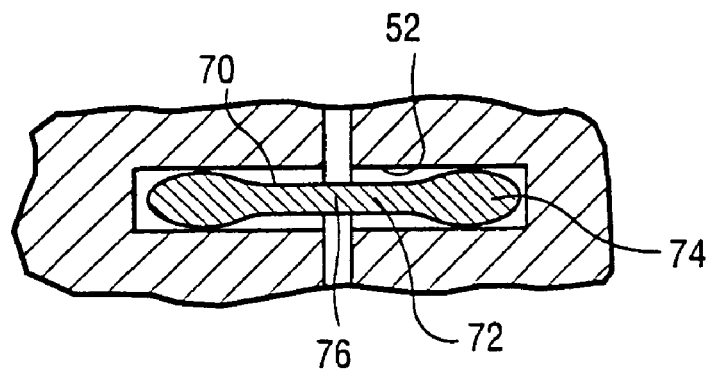
FIG. 4 is a fragmentary cross-sectional view of a further form of a spline seal.

Each spline seal, as indicated previously, may comprise a flat metal plate as illustrated in FIG. 3. Alternatively, and referring to FIG. 4, illustrating a further form of spline seal, a spline seal 70 may comprise a seal body 72 with enlargements 74 along opposite edges or ends of the seal for disposition adjacent the bases of the slots. Thus, the central portion 76 of the seal body 72 has a reduced depth dimension in comparison with the width of the grooves. The enlargements 74 facilitate relative movement of the segments, e.g., the diaphragm segments 34 and 36 in radial directions without binding or damaging the spline seal. Also, a slight shift in the spline seal 70 and the ends of the slots is accommodated. Such spline seals may be of the type disclosed in commonly-owned U.S. Pat. No. 5,624,227, the disclosure of which is incorporated herein by reference.

Figure 5:
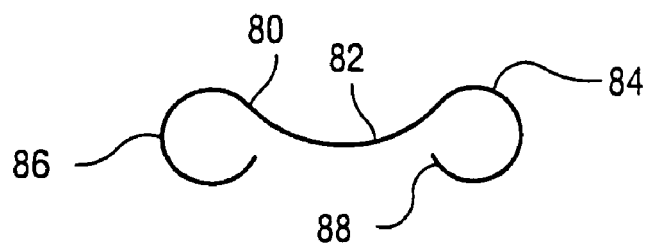
FIG. 5 is a schematic illustration of a Q-tip spline seal.

Referring now to FIG. 5, another form of spline seal is illustrated. Spline seal 80 of FIG. 5 may be formed of sheet metal material having a seal body 82 with opposite ends reversely curved or bent at 84 to form enlargements 86 along opposite sides of the spline seal. Edges 88 of the reversely-curved portions face a central portion of the seal body 82. The enlargements 86, like the enlargements 72 of spline seal 70 of FIG. 4, are disposed adjacent the bases of the slots. This type of spline seal is also disclosed in the above-referenced patent.

Figure 6:
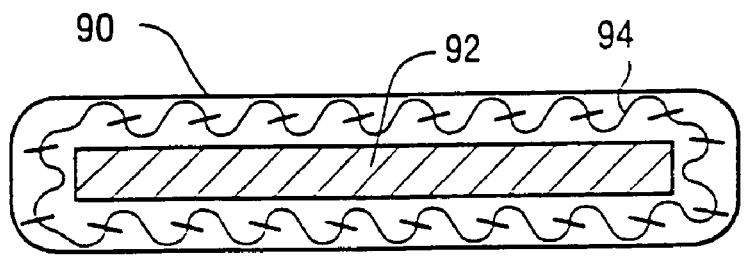
FIG. 6 is an enlarged fragmentary cross-sectional view of a spline seal with a metallic cloth covering therefor.

In FIG. 6, there is illustrated a spline seal 90 having a central core 92 formed of metal and having an overlay of cloth 94. The cloth layer may be comprised of metal, ceramic and/or polymer fibers which have been woven to form a layer of fabric. The overlying cloth may be of the type disclosed in commonly-owned U.S. Pat. No. 5,934,687, the disclosure of which is incorporated herein by reference.

It will be appreciated from the foregoing that the spline seals are provided in the gaps at the horizontal or midline joints between the upper and lower semi-annular diaphragm segments. The spline seals minimize or preclude steam leakage flow past the gaps in radial and axial directions with resulting improvement in machine performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine comprising:
   a rotor carrying a plurality of circumferentially spaced buckets;
   a diaphragm assembly surrounding the rotor including upper and lower diaphragm segments having end faces in registration with one another adjacent horizontal joints of the turbine, each said segment including substantially semi-annular outer and inner rings carrying a plurality of circumferentially spaced partitions therebetween, the buckets and partitions forming a stage of the steam turbine;

the registering end faces of one of said inner and outer semi-annular rings at each horizontal joint having slots opening therethrough and in general circumferential registration with one another; and a spline seal in said slots extending between each of said opposed end faces of circumferentially adjacent segments for minimizing or precluding steam leakage flow past said registering end faces.

2. A steam turbine according to claim 1 wherein each said spline seal extends generally in axial and circumferential directions for sealing against steam leakage flows in generally radial directions.

3. A steam turbine according to claim 1 wherein each said spline seal extends generally in radial and circumferential directions for sealing against steam leakage flows in a generally axial direction.

4. A steam turbine according to claim 1 wherein each said spline seal includes a cloth surrounding said spline seal along opposite sides thereof and about at least a pair of opposite edges thereof.

5. A steam turbine according to claim 1 wherein each said spline seal comprises a seal body having an enlargement along opposite edges and received in said slots with the enlargements adjacent bases of said slots, respectively.

6. A steam turbine according to claim 5 wherein said seal body is formed of sheet metal, said enlargements comprising integral bent portions of said sheet metal spline seal having edges facing central portions of said sheet metal spline.

7. A steam turbine according to claim 1 wherein the registering end faces of another of said inner and outer semi-annular rings at each horizontal joint have slots opening therethrough and in general circumferential registration with one another, a spline seal extending between each of said opposed end faces of circumferentially adjacent segments and in said slots of said end faces of said another of said inner and outer half-rings for minimizing or precluding steam leakage flow past said registering end faces.

8. A steam turbine according to claim 7 wherein each said spline seal extends generally in axial and circumferential directions for sealing against steam leakage flows in generally radial directions.

9. A steam turbine according to claim 7 wherein each said spline seal extends generally in radial and circumferential directions for sealing against steam leakage flows in a generally axial direction.

10. A steam turbine according to claim 7 wherein each said spline seal includes a cloth surrounding said spline seal along opposite sides thereof and about at least a pair of opposite edges thereof.

11. A steam turbine according to claim 7 wherein each said spline seal comprises a seal body having an enlargement along opposite edges and received in said slots with the enlargements adjacent bases of said slots, respectively.

12. A steam turbine according to claim 7 wherein said seal body is formed of sheet metal, said enlargements comprising integral bent portions of said sheet metal spline seal having edges facing central portions of said sheet metal spline.

13. A steam turbine comprising:

a rotor carrying a plurality of circumferentially spaced buckets;

a diaphragm assembly surrounding the rotor including upper and lower diaphragm segments having end faces in registration with one another adjacent horizontal joints of the turbine, each said segment including substantially semi-annular outer and inner rings carrying a plurality of circumferentially spaced partitions therebetween, the buckets and partitions forming a stage of the steam turbine;

the registering end faces of said inner and outer semi-annular rings at each horizontal joint having slots opening therethrough and in general circumferential registration with one another; and a first spline seal extending between each of said opposed end faces of circumferentially adjacent inner rings and in said slots thereof, and a second spline seal extending between each of said opposed end faces of circumferentially adjacent outer rings and in said slots, whereby steam leakage flow past said registering end faces is minimized or precluded.

14. A steam turbine according to claim 13 wherein each said first and second spline seals extends generally in axial and circumferential directions for sealing against steam leakage flows in generally radial directions.

15. A steam turbine according to claim 13 wherein each said first and second spline seals extend generally in radial and circumferential directions for sealing against steam leakage flows in a generally axial direction.

* * * * *

UNITED STATES PATENT AND TRADEMARK OFFICE
CERTIFICATE OF CORRECTION

PATENT NO. : 6,971,844 B2
DATED : December 6, 2005
INVENTOR(S) : Burdgick

It is certified that error appears in the above-identified patent and that said Letters Patent is hereby corrected as shown below:

<u>Title page,</u>
Item [*] Notice:, insert -- This patent is subject to a terminal disclaimer. --.

Signed and Sealed this

Fourth Day of April, 2006

JON W. DUDAS
*Director of the United States Patent and Trademark Office*